Reissued Apr. 9, 1935

Re. 19,517

UNITED STATES PATENT OFFICE 19,517

PRESERVATION OF METALLURGICAL FURNACE BOTTOMS

Arthur Tregoning Cape and Kiel B. Bowman, Massillon, Ohio, assignors to Republic Steel Corporation, Youngstown, Ohio, a corporation of New Jersey No Drawing. Original No. 1,894,755, dated January 17, 1933, Serial No. 505,582, December 30, 1930. Application for reissue October 25, 1933, Serial No. 695,162

11 Claims. (Cl. 75—22.5)

This invention relates to the preservation of the bottoms of metallurgical furnaces, such as are commonly employed in the manufacture of steel and alloys thereof.

In the manufacture of steel and alloys thereof in open hearth and electric furnaces, slags are formed, which, if not removed prior to tapping of the heat from the furnace, settle to the bottom of the furnace, coat and seep into the bottom material which may be magnesite, and penetrate cracks that may be present therein. Upon solidification and subsequent cooling of the slag a phenomenon occurs, the exact nature of which is not known but which is apparently an inversion from one molecular form to another. This inversion is usually accompanied by dilation or expansion and which in turn causes an expansion and resultant disintegration of the furnace bottoms to a depth of several inches. When this takes place, the disintegrated portion of the bottom must be removed and replaced by new bottom material. This dilation or expansion of the slag is believed to be due to certain characteristics of the constituent elements of the slag, namely, lime silicates.

Even when disintegration of the bottom occurs to only a slight degree, a charge of cold scrap placed on the bottom for the succeeding heat will cause additional disintegration due to the chilling effect of the scrap on the entrapped slag.

The presence of reducible oxides in the slag, such as those of iron, manganese and phosphorus would tend to prevent inversion of the slag on solidification and subsequent cooling, but in electric furnaces there is usually a deficiency of such oxides.

As a result of a series of experiments, we have discovered, that the inversion and dilation of the slag on solidification and subsequent cooling and consequent disintegration of the furnace bottom may be entirely prevented and the furnace bottom maintained substantially intact by the addition to the slag of a borate in relatively small quantities i. e. from about .5% to about 5% by weight of the slag from about 1% to about 2% being preferably employed. While any borate may be satisfactorily employed borax is preferably used and in the form known as "borax glass" that is to say borax from which the water of crystallization has been removed.

The borax glass is preferably added to the slag immediately prior to tapping of the heat sufficient time being allowed before tapping to permit uniform distribution of the borax glass in the slag. The borax glass may also be added to the slag after the heat has been tapped in which case it must be added to the slag before the latter has solidified.

If desired, the borax glass may be incorporated with the material of the furnace bottom or may even be sprinkled over the furnace bottom prior to placing the charge thereon.

While borates have been found to be eminently satisfactory for the purpose of stabilizing and preventing inversion of the slag on solidification and subsequent cooling, phosphates may also be employed for this purpose. Their use, in electric furnaces, is however, not desirable, because they are easily reduced under the conditions prevailing at the end of the heat.

Salts of sodium other than borax such as sodium chloride and sodium carbonate have also been employed with satisfactory results but quantities excessively large for electric furnace use must be employed.

Although the foregoing description is necessarily of a detailed character in order to completely set forth this invention it is to be understood that the specific terminology is not intended to be restrictive or confining and is further understood that various modifications may be resorted to without departing from the scope and spirit of the invention herein claimed.

We claim:

1. The method of preserving metallurgical furnace bottoms which are normally subject to disintegration by the expansion of slag which seeps therein and expands on solidification and subsequent cooling, consisting in incorporating a borate with the slag before the latter solidifies.

2. The method of preserving metallurgical furnace bottoms which are normally subject to disintegration by the expansion of slag which seeps therein and expands on solidification and subsequent cooling, consisting in incorporating borax glass with the slag before the latter solidifies.

3. The method of preserving metallurgical furnace bottoms which are normally subject to disintegration by the expansion of slag which seeps therein and expands on solidification and subsequent cooling, consisting in incorporating a borate in amounts of from about .5% to about 5% with the slag before the latter solidifies.

4. The method of preserving metallurgical furnace bottoms which are normally subject to disintegration by the expansion of slag which seeps therein and expands on solidification and subsequent cooling, consisting in incorporating borax glass in amounts of from about .5% to about 5% with the slag before the latter solidifies.

5. The method of preserving metallurgical furnace bottoms which are normally subject to disintegration by the expansion of slag which seeps therein and expands upon solidification and subsequent cooling consisting in incorporating a borate in amounts of from about 1% to about 2% with the slag before the latter solidifies.

6. The method of preserving metallurgical furnace bottoms which are normally subject to disintegration by the expansion of slag which seeps therein and expands upon solidification and subsequent cooling consisting in incorporating borax glass in amount of from about 1% to about 2% with slag before the latter solidifies.

7. The method of preserving electric furnace bottoms into which slag can seep and penetrate which includes the steps of bringing molten slag containing dilation producing substances into contact with the bottom in the presence of an inversion or dilation preventing borate in such a manner as to bring about a reaction between the dilation producing ingredient of the molten slag and the dilation preventing substance to prevent dilation of the former during cooling and permitting the molten slag to solidify in the furnace bottom.

8. The method of preserving electric furnace bottoms into which slag can seep and penetrate which includes the steps of incorporating in the bottom material a dilation preventing borate, bringing molten slag containing a dilation producing substance into contact with the bottom, in a manner as to bring about a reaction between the dilation producing ingredient of the molten slag and the dilation preventing substance incorporated in the bottom material with resultant prevention of expansion of the cooling slag in the bottom and permitting the molten slag to solidify in the bottom.

9. The method of preserving electric furnace bottoms into which slag can seep and penetrate which includes the steps of placing on the bottom material a dilation preventing borate, bringing molten slag containing a dilation producing substance into contact with the furnace bottom in such a manner as to bring about a reaction between the dilation producing ingredient of the molten slag and the dilation preventing substance disposed on the bottom material with resultant prevention of expansion of the cooling slag in the bottom and permitting the molten slag to solidify in the bottom material.

10. The method of preserving electric furnace bottoms into which slag containing a dilation producing substance can seep and penetrate which includes the steps of incorporating with the slag while in the molten condition in the furnace a dilation preventing borate and permitting the molten slag to solidify in the bottom.

11. Method of preserving the bottoms of electrical furnaces into which slag can seep and penetrate which includes the steps of bringing molten slag containing dilation producing substances into contact with the bottom in the presence of a borate in such a manner as to bring about a reaction between the dilation producing ingredient of the molten slag and the borate and permitting the molten slag to solidify in the furnace bottom.

A. TREGONING CAPE.
KIEL B. BOWMAN.